(12) United States Patent
Tabarovsky et al.

(10) Patent No.: US 7,392,137 B2
(45) Date of Patent: Jun. 24, 2008

(54) DETERMINATION OF FORMATION ANISTROPHY, DIP AND AZIMUTH

(75) Inventors: Leonty A. Tabarovsky, Cypress, TX (US); Michael Rabinovich, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 495 days.

(21) Appl. No.: 10/867,619

(22) Filed: Jun. 15, 2004

(65) Prior Publication Data

US 2005/0274512 A1  Dec. 15, 2005

(51) Int. Cl.
G01V 1/40 (2006.01)
G01V 3/00 (2006.01)

(52) U.S. Cl. .......................................... 702/7; 324/335

(58) Field of Classification Search ................ 702/7, 702/9–11, 2, 6; 324/332–333, 335, 337–339; 175/45

See application file for complete search history.

(56) References Cited

U.S. PATENT DOCUMENTS

| | | | | |
|---|---|---|---|---|
| 4,837,517 | A | | 6/1989 | Barber ........................ 324/339 |
| 5,157,605 | A | | 10/1992 | Chandler et al. ............. 364/422 |
| 5,329,448 | A | | 7/1994 | Rosthal ....................... 364/422 |
| 5,452,761 | A | | 9/1995 | Beard et al. ................. 166/250 |
| 5,656,930 | A | | 8/1997 | Hagiwara .................... 324/339 |
| 5,781,436 | A | | 7/1998 | Forgang et al. ............. 364/422 |
| 5,884,227 | A | * | 3/1999 | Rabinovich et al. ............ 702/7 |
| 5,999,883 | A | * | 12/1999 | Gupta et al. .................... 702/7 |
| 6,092,024 | A | | 7/2000 | Wu ................................ 702/7 |
| 6,147,496 | A | * | 11/2000 | Strack et al. ................ 324/343 |
| 6,163,155 | A | * | 12/2000 | Bittar ......................... 324/338 |
| 6,393,364 | B1 | * | 5/2002 | Gao et al. ....................... 702/7 |
| 6,556,016 | B2 | * | 4/2003 | Gao et al. .................... 324/343 |
| 6,574,562 | B2 | * | 6/2003 | Tabarovsky et al. ............ 702/7 |
| 6,636,045 | B2 | * | 10/2003 | Tabarovsky et al. ......... 324/343 |
| 6,760,666 | B2 | * | 7/2004 | Hagiwara ....................... 702/7 |
| 6,819,111 | B2 | * | 11/2004 | Fanini et al. ................ 324/339 |
| 6,906,521 | B2 | * | 6/2005 | Tabarovsky ................. 324/334 |
| 6,925,384 | B2 | * | 8/2005 | Frenkel et al. .................. 702/7 |
| 6,950,749 | B2 | * | 9/2005 | Frenkel et al. .................. 702/7 |
| 2003/0028324 | A1 | | 2/2003 | Xiao et al. ..................... 702/7 |
| 2003/0055565 | A1 | | 3/2003 | Omeragic ...................... 702/7 |
| 2003/0057950 | A1 | | 3/2003 | Gao et al. .................... 324/339 |
| 2003/0105591 | A1 | | 6/2003 | Hagiwara ....................... 702/7 |
| 2003/0146752 | A1 | | 8/2003 | Gianzero et al. ............ 324/343 |
| 2004/0059513 | A1 | | 3/2004 | Bittar et al. .................... 702/7 |
| 2004/0108853 | A1 | | 6/2004 | Rosthal ....................... 324/343 |
| 2004/0183538 | A1 | | 9/2004 | Hanstein et al. ............. 324/339 |

OTHER PUBLICATIONS

Yu et al., The Reduction of Near Zone Effects on the Multi-component Induction Logging Tool, Oct. 5-8, 2003, SPE Annual Technical Conference and Exhibition, SPE 84097.*
Tabarovsky et al., Measuring Formation Anisotropy Using Multifrequency Processing of Traverse Induction Measurements, 2001, SPE 71706, pp. 1-7.*

* cited by examiner

Primary Examiner—John E. Barlow, Jr.
Assistant Examiner—Toan M Le
(74) Attorney, Agent, or Firm—Madan, Mossman & Sriram, P.C.

(57) ABSTRACT

Multifrequency focusing is applied to measurements made with a multicomponent resistivity logging tool in an earth formation having resisitivity anisotropy. From knowledge of relative dip and azimuth of the borehole relative to the formation, two modes can be separated, one of which is dependent substantially on the horizontal resistivity. Alternatively, mode separation and angle determination can be made simultaneously.

40 Claims, 4 Drawing Sheets

DETERMINATION OF FORMATION ANISTROPHY, DIP AND AZIMUTH

BACKGROUND OF THE INVENTION

1. Field of the Invention

The invention is related generally to the field of interpretation of measurements made by well logging instruments for the purpose of determining the properties of earth formations. More specifically, the invention is related to a method for determination of anisotropic formation resistivity in a deviated wellbore using multifrequency, multicomponent resistivity data.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones that are typically hydrocarbon bearing and are of the most interest to the instrument user.

The effect of formation anisotropy on resistivity logging measurements has long been recognized. Kunz and Moran studied the anisotropic effect on the response of a conventional logging device in a borehole perpendicular to the bedding plane of a thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Hagiwara (U.S. Pat. No. 5,656,930) shows that the log response of an induction-type logging tool can be described by an equation of the form $$V \propto i/L^3(-2e^{ikL}(1-ikL)+ikL(e^{ik\beta}-e^{ikL})) \quad (1)$$

where $$\beta^2 = \cos^2\theta + \lambda^2 \sin^2\theta \quad (2)$$

and $$k^2 = \omega^2\mu(\epsilon_h + i\sigma_h/\omega) \quad (3)$$

where L is the spacing between the transmitter and receiver, k is the wave number of the electromagnetic wave, $\mu$ is the magnetic permeability of the medium, $\theta$ is the deviation of the borehole angle from the normal to the formation, $\lambda$ is the anisotropy factor for the formation, $\omega$ is the angular frequency of the electromagnetic wave, $\sigma_h$ is the horizontal conductivity of the medium and $\epsilon_h$ is the horizontal dielectric constant of the medium.

Eq. (1) is actually a pair of equations—one corresponding to the real part and one corresponding to the imaginary part of the measured signal—and has two unknowns. By making two measurements of the measured signal, the parameters k and $\beta$ can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, $\epsilon$ can be neglected in Eq. (3) and from known values of $\omega$ and $\mu$, the conductivity $\omega$ can be determined from k, assuming a value of $\mu$ equal to the permittivity of free space.

Wu (U.S. Pat. No. 6,092,024) recognized that the solution to Eqs. (1)-(3) may be non-unique and showed how this ambiguity in the solution may be resolved using a plurality of measurements obtained from multiple spacings and/or multiple frequencies. The methods of Rosthal, of Hagiwara, and of Wu can only be used in deviated boreholes where the borehole axis makes a nonzero angle to the normal to the bedding plane.

One solution to the limitation of the induction instruments known in the art is to include a transverse transmitter coil and a transverse receiver coil on the induction instrument, whereby the magnetic moments of these transverse coils is substantially perpendicular to the axis of the instrument. Such a solution is suggested in Tabarovsky and Epov, ("Geometric and Frequency Focusing in Exploration of Anisotropic Seams", Nauka, USSR Academy of Science, Siberian Division, Novosibirsk, pp. 67-129 (1972).) using various arrangements of transverse transmitter coils and transverse receiver coils as well as simulations of the responses of these transverse coil systems. Tabarovsky and Epov also describe a method of substantially reducing the effect on the voltage induced in transverse receiver coils which would be caused by eddy currents flowing in the wellbore and invaded zone. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore and invasion zone, can be substantially eliminated from the final result. Tabarovsky and Epov, however, do not suggest any configuration of signal processing circuitry which could perform the frequency focusing method suggested in their paper.

Strack et al. (U.S. Pat. No. 6,147,496) describe a multi-component logging tool comprising a pair of 3-component transmitters and a pair of 3-component receivers. Using measurements made at two different frequencies, a combined signal is generated having a reduced dependency on the electrical conductivity in the wellbore region. U.S. Pat. No. 5,781,436 to Forgang et al, the contents of which are fully incorporated herein by reference, discloses a suitable hardware configuration for multifrequency, multicomponent induction logging.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured at a single frequency. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes that is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter. One drawback in the teachings of Gupta et al is the step of determination of the relative angle of inclination of the required measurements of three components of data with substantially identical transmitter-receiver spacings. Because of limitations on the physical size of the tools, this condition is difficult to obtain; consequently the estimates of resistivities are susceptible to error. In addition, due to the highly nonlinear character of the response of multicomponent tools, such inversion methods are time consuming at a single frequency and even more so at multiple frequencies.

U.S. Pat. No. 6,574,562 to Tabarovsky et al. teaches a computationally fast method of determination of horizontal and vertical conductivities of subsurface formations using a combination of data acquired with a transverse induction logging tool such as the 3DEX$^{SM}$ tool of Baker Hughes Incorporated and data acquired with a conventional high definition induction logging tool (HDIL). The data are acquired in a vertical borehole. The HDIL data are used to determine horizontal resistivities that are used in an isotropic model to obtain expected values of the transverse components of the 3DEX$^{SM}$. Differences between the model output and the acquired 3DEX$^{SM}$ data are indicative of anisotropy, and this difference is used to derive an anisotropy factor. The method described therein has difficulties in deviated boreholes as the HDIL measurements used to derive the isotropic model are responsive to both horizontal and vertical resistivity. The procedure disclosed in Tabarovsky '562 is iterative.

U.S. Pat. No. 6,636,045, to Tabarovsky et al., discusses a method of logging subsurface formations using data acquired with a transverse induction logging tool, the formation having a horizontal conductivity and a vertical conductivity, by obtaining a plurality of frequencies measurements indicative of vertical and horizontal conductivities in a tool referenced coordinate system. The data are transformed to a subsurface formation coordinate system. Multifrequency focusing is applied to the measurements at a plurality of frequencies. Horizontal formation conductivities are determined from a subset of the focused conductivity measurements. Vertical formation conductivities are determined from the focused conductivity measurements associated with the subsurface formation and the horizontal conductivities. The method of Tabarovsky '045 required an estimate of the inclination angle and iteratively determines an estimate of the conductivities.

There is a need for a fast and robust method of determination of anisotropic resistivity without the need of an accurate estimate of angles and a fast procedure for determining the resistivity values. Such a method should preferably be able to use multifrequency measurements. The present invention satisfies this need.

SUMMARY OF THE INVENTION

The present invention is an apparatus for and a method of logging an earth formation comprising a plurality of layers each having a horizontal conductivity and a vertical conductivity. An electromagnetic logging tool is conveyed into a borehole into the earth formation. The logging tool includes a plurality of transmitters and a plurality of receivers, at least one of the transmitters and at least one of the receivers being inclined to an axis of the tool by a nonzero angle. The borehole itself is inclined at a nonzero angle dip angle θ to a normal to the layers. Measurements are made with a plurality of transmitter-receiver pairs at more than one frequency. Frequency focusing is applied to the measurements. In one embodiment of the invention, using known values of the relative dip angle and azimuth, the focused measurements are separated into two or more fundamental modes. One of the fundamental modes is related primarily to the horizontal conductivity (or resistivity) of the earth formation, so that the horizontal conductivity may be obtained from the first mode. Using the determined horizontal conductivity and the second mode, the vertical conductivity may be determined.

In another embodiment of the invention, the fundamental modes and the relative dip angle and azimuth are determined simultaneously. The simultaneous determination is done by searching over a range of relative dip angles and azimuths. Alternatively, the search may be done over a range of absolute dips and azimuths and using measurements made by orientation and navigation sensors on the tool.

The processing may be done using a downhole or surface processor. The method is equally applicable for wireline measurements and for measurements made by sensors on a drillstring.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
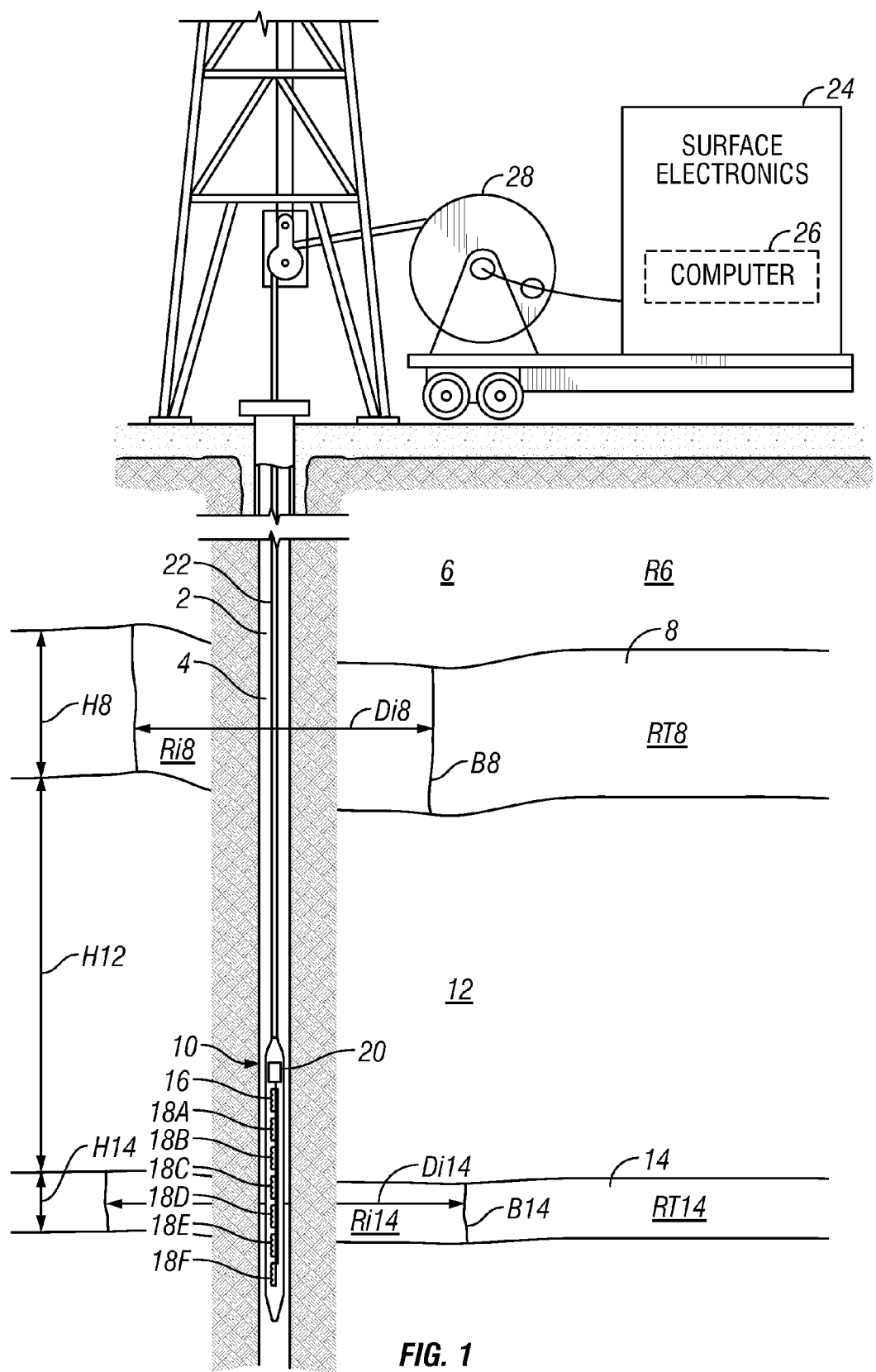
FIG. 1 (Prior art) shows an induction instrument disposed in a wellbore penetrating earth formations.

FIG. 1 (prior art) shows an induction well logging instrument 10 disposed in a wellbore 2 penetrating earth formations. The earth formations are shown generally at 6, 8, 12 and 14. The instrument 10 is typically lowered into the wellbore 2 at one end of an armored electrical cable 22, by means of a winch 28 or similar device known in the art. An induction well logging instrument which will generate appropriate types of signals for performing the process of the present invention is described, for example, in U.S. Pat. No. 5,452,761 issued to Beard et al. The prior art induction logging tool includes a transmitter coil and a plurality of receiver coils 18A-18F. The coils in the prior art device are oriented with the coil axes parallel to the axis of the tool and to the wellbore. Surface electronics 24 includes a computer or processor 24. The resistivities and thicknesses of the layers are denoted by RT6, RT8, RT14 and H8, H12, H14 respectively. The layers may be invaded by borehole fluids to distances denoted, for example, by Di8 and Di14. The resistivities of the invaded zone are denoted by Ri8 and Ri14.

Figure 2:
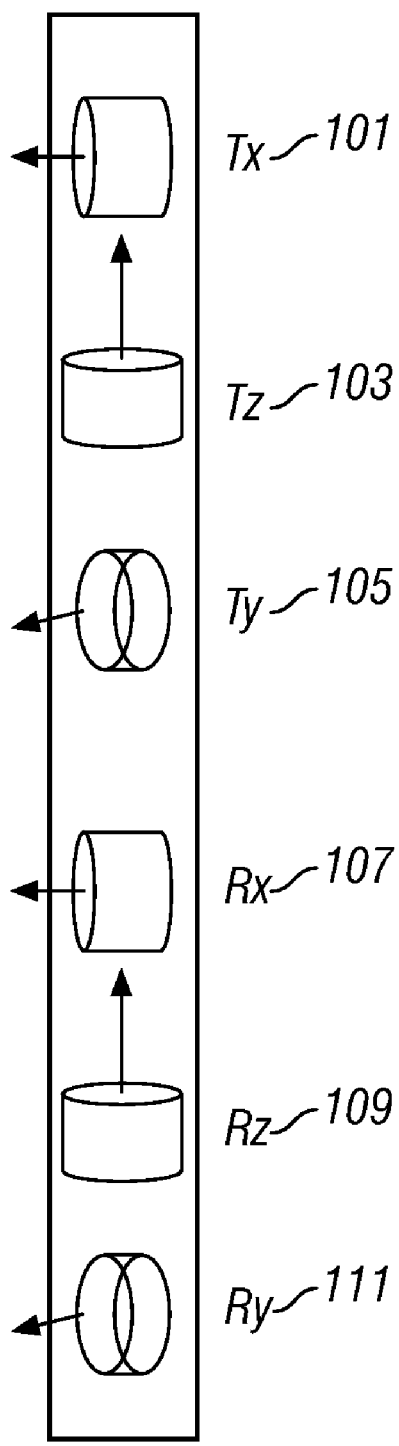
FIG. 2 shows the arrangement of transmitter and receiver coils in a preferred embodiment of the present invention marketed under the name 3DEX$^{SM}$.

Turning now to FIG. 2, the configuration of transmitter and receiver coils in a preferred embodiment of the 3DEX™ induction logging instrument of Baker Hughes Incorporated is disclosed. Such a logging instrument is an example of a transverse induction logging tool. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are receivers 107, 109 and 111, referred to as the $R_x$, $R_z$, and $R_y$ receivers, for measuring the corresponding components ($h_{xx}$, $h_{yy}$, $h_{zz}$) of induced signals. In addition, cross-components are also measured. These are denoted by $h_{xy}$, $h_{xz}$ etc. For each component, the first index indicates the orientation of a transmitter and the second index specifies the orientation of a receiver.

Figure 3:
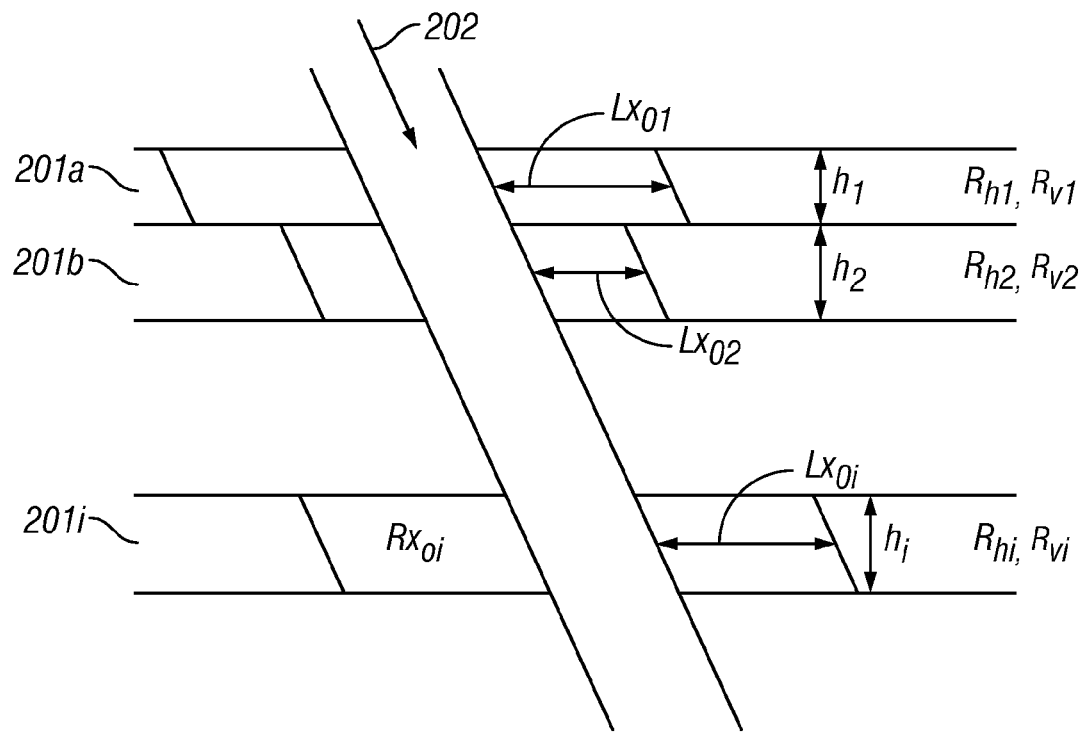
FIG. 3 shows an earth model example used in the present invention.

FIG. 3 is a schematic illustration of the model used in the present invention. The subsurface of the earth is characterized by a plurality of layers $201a$, $201b$, ..., $201i$. The layers have thicknesses denoted by $h_1$, $h_2$, ... $h_i$. The horizontal and vertical resistivities in the layers are denoted by $R_{h1}$, $R_{h2}$, ... $R_{hi}$ and $R_{v1}$, $R_{v2}$, ... $R_{vi}$ respectively. Equivalently, the model may be defined in terms of conductivities (reciprocal of resistivity). The borehole is indicated by 202 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{x01}$, $L_{x02}$, ... $L_{x0i}$ extending away from the borehole. The resistivities in the invaded zones are altered to values $R_{x01}$, $R_{x02}$, ... $R_{x0i}$. It should further be noted that the discussion of the invention herein may be made in terms of resistivities or conductivities (the reciprocal of resistivity). The z-component of the 3DEX™ tool is oriented along the borehole axis and makes an angle θ (not shown) with the normal to the bedding plane.

In Tabarovsky '562 multifrequency, multicomponent induction data are obtained using, for example, the 3DEX™ tool, and a multifrequency focusing is applied to these data. As disclosed in U.S. Pat. No. 5,703,773 to Tabarovsky et at, the contents of which are fully incorporated herein by reference, the response at multiple frequencies may be approximated by a Taylor series expansion of the form:

$$\begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \cdots & \omega_1^{n/2} \\ 1 & \omega_2^{1/2} & \omega_2^{3/2} & \cdots & \omega_2^{n/2} \\ \vdots & \vdots & \vdots & \ddots & \vdots \\ 1 & \omega_{m-1}^{1/2} & \omega_{m-1}^{3/2} & \cdots & \omega_{m-1}^{n/2} \\ 1 & \omega_m^{1/2} & \omega_m^{3/2} & \cdots & \omega_m^{n/2} \end{bmatrix} \begin{bmatrix} s_0 \\ s_{1/2} \\ \vdots \\ s_{(n-1)/2} \\ s_{n/2} \end{bmatrix} \quad (4)$$

In an exemplary embodiment of the invention of Tabarovsky '562, the number m of frequencies ω is ten, and n is the number of terms in the Taylor series expansion and can be any number less than or equal to m. The coefficient $s_{3/2}$ of the $\omega^{3/2}$ term (ω being the angular frequency) is relatively unaffected by any inhomogeneities in the medium surround the logging instrument, i.e., it is responsive primarily to the formation parameters and not to the borehole and invasion zone. In fact, the coefficient $s_{3/2}$ of the $\omega^{3/2}$ term is responsive to the formation parameters as though there were no borehole in the formation. Specifically, these are applied to the $h_{xx}$ and $h_{yy}$ components. Those versed in the art would recognize that in a vertical borehole, the $h_{xx}$ and $h_{yy}$ would be the same, with both being indicative of the vertical conductivity of the formation. In one embodiment of the invention, the sum of the $h_{xx}$ and $h_{yy}$ is used so as to improve the signal to noise ratio (SNR).

Next, an explanation of an exemplary method of present invention is presented. The conductivity tensor of a horizontally layered formation with transversely anisotropic conductivity in each layer can be described using the matrix:

$$\hat{\sigma} = \begin{pmatrix} \sigma_h & 0 & 0 \\ 0 & \sigma_h & 0 \\ 0 & 0 & \sigma_v \end{pmatrix} \quad (8)$$

where $\sigma_h$ is the formation conductivity in the horizontal direction and $\sigma_v$ is the formation conductivity in the vertical direction. In contrast, at every depth, the multi-component induction logging tool acquires the following matrix of magnetic measurements $$\hat{H} = \begin{pmatrix} h_{xx} & h_{xy} & h_{xz} \\ h_{yx} & h_{yy} & h_{yz} \\ h_{zx} & h_{zy} & h_{zz} \end{pmatrix} \quad (9)$$

Not every element of the magnetic matrix Eq. (9) is non-zero; the tool may acquire less than 9 components. The actual number of transmitter-receiver components for which measurements are made maybe designated by $n_1$. The number $n_1$ is greater than 1, so that measurements are made with a plurality of transmitter-receiver pairs. At every logging depth, the magnetic matrix of Eq. (9) is a function of a formation conductivities $\sigma_h$ and $\sigma_v$ and two angles: relative dip $\theta$ (an angle between the formation normal and the tool axis) and relative rotation $\phi$ (the angle between the x-oriented sensor and the plane containing the tool axis and formation normal). As discussed in prior art (see, for example, Tabarovsky et al., 2001, "Measuring formation anisotropy using multi-frequency processing of transverse induction measurements", SPE 71706), the relative dip $\theta$ and relative rotation angles $\phi$ can be further expressed using five quantities: formation dip and formation azimuth in the gravity reference system plus measured tool orientation angles DEV, RB, DAZ. A full description of the relation between the different angles is given in U.S. Pat. No. 6,643,589 to Zhang et al., having the same assignee as the present invention and the contents of which are fully incorporated herein by reference. It should be noted that the matrix of measurements given by eq. (9) can be obtained using x-, y- and z-oriented transmitters and receivers as shown in FIG. 2. The same matrix can also be obtained by suitable rotation of coordinates of measurements made by other transmitter and receiver orientations, including those in which the transmitter and receiver axes are not orthogonal to each other or to the tool axis. In the present invention, when reference is made to the matrix of magnetic moments, it is intended to include data acquired with such non-orthogonal transmitter and receiver orientations.

Generally, the magnetic matrix Eq. (9) cannot be diagonalized in a deviated well. Even in a simple model, such as for a thick anisotropic layer, the magnetic matrix has non-zero off-diagonal components. The magnetic matrix is of the form:

$$\hat{H} = \begin{pmatrix} h_{xx} & 0 & h_{xz} \\ 0 & h_{yy} & 0 \\ h_{zx} & 0 & h_{zz} \end{pmatrix} \quad (10)$$

Multi-frequency focusing techniques can be applied to the magnetic matrix to extract terms proportional to $\omega^{3/2}$ where $\omega$ is the angular frequency (see U.S. Pat. No. 6,574,562 to Tabarovsky et al., and Yu et al., 2003 "The reduction of near zone effects on the multi-component induction logging tool," SPE 84097). In a general case, in a deviated well, the matrix of MFF components has the following form:

$$\hat{H}_{MFF} = \begin{pmatrix} \tilde{h}_{xx} & \tilde{h}_{xy} & \tilde{h}_{xz} \\ \tilde{h}_{yx} & \tilde{h}_{yy} & \tilde{h}_{yz} \\ \tilde{h}_{zx} & \tilde{h}_{zy} & \tilde{h}_{zz} \end{pmatrix} \quad (11)$$

The focused multifrequency components are obtained by applying multifrequency focusing (MFF) to measurements made at, say $n_2$ different frequencies. The number $n_2$ must be greater than 1 in order to accomplish MFF. Thus, the $n_1$ components noted above are measured at a plurality of frequencies. Typically, the response of the multi-component induction tool is strongly affected by the near-borehole environment. When multi-frequency focusing (MFF) is applied to the magnetic matrix to extract terms proportional to $\omega^{3/2}$, these near-borehole effects can be eliminated.

The matrix of MFF components, Eq. (11), looks similar to the magnetic matrix of Eq. (9). Unlike single frequency measurements of Eq. (9), the tensor of the multi-frequency focused magnetic field of Eq. (11) can be diagonalized. It is shown below by a numerical example that the tensor of the focused multi-frequency magnetic field is diagonal in the coordinate system containing the formation normal:

$$\hat{H}_{MFF} = \begin{pmatrix} \hbar_{xx} & 0 & 0 \\ 0 & \hbar_{xx} & 0 \\ 0 & 0 & \hbar_{zz} \end{pmatrix} \quad (12)$$

An equation of the form given by Eq. (12) therefore comprises two fundamental modes $\hbar_{xx}$ and $\hbar_{zz}$. Note that the off-diagonal terms are zero, and that the (x,x) and the (y,y) elements of the matrix are equal, just as they are in the conductivity tensor given by eq. (8). The value of the $\hbar_{xx}$ mode depends both on horizontal and vertical conductivity, while the $\hbar_{zz}$ mode depends only on horizontal conductivity.

The measured MFF components of Eq. (11) are expressed in terms of the principal components $\hbar_{xx}$, $\hbar_{zz}$ of Eq. (12) and angles $\theta$, $\phi$ using the relations:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\theta^2 \\ c_\phi s_\phi - c_\phi s_\phi c_\theta^2 & -c_\phi s_\phi s_\theta^2 \\ c_\phi c_\theta s_\theta & -c_\phi c_\theta s_\theta \\ c_\phi s_\phi - c_\phi s_\phi c_\theta^2 & -c_\phi s_\phi s_\theta^2 \\ s_\phi^2 c_\theta^2 + c_\phi^2 & s_\phi^2 s_\theta^2 \\ -s_\phi c_\theta s_\theta & s_\phi c_\theta s_\theta \\ c_\phi c_\theta s_\theta & -c_\phi c_\theta s_\theta \\ -s_\phi c_\theta s_\theta & s_\phi c_\theta s_\theta \\ s_\theta^2 & c_\theta^2 \end{pmatrix} \begin{pmatrix} \hbar_{xx} \\ \hbar_{zz} \end{pmatrix}, \quad (13)$$

where $\theta$ is the relative inclination of the borehole axis to the normal to the bedding while $\phi$ is the azimuth. These angles are in the tool coordinate system. As noted above, Zhang et al. provides a description of the different coordinate systems, $s_\phi = \sin \phi$,
$c_\phi = \cos \phi$,
$s_\theta = \sin \theta$,
$c_\theta = \cos \theta$.

Eq. (13) enables a calculation of the principal MFF components of Eq. (12). A typical method of solving Eq. (13) employs a least squares method. The obtained principal MFF components $\hbar_{xx}$ and $\hbar_{zz}$ enable a sequential process for obtaining conductivity parameters. First, the horizontal conductivities can be determined from the $\hbar_{zz}$ component using the standard inversion methods of prior art, and then the vertical conductivity can be determined from the $h_{xx}$ component and the horizontal conductivity, again using the standard inversion methods of prior art.

Figure 4:
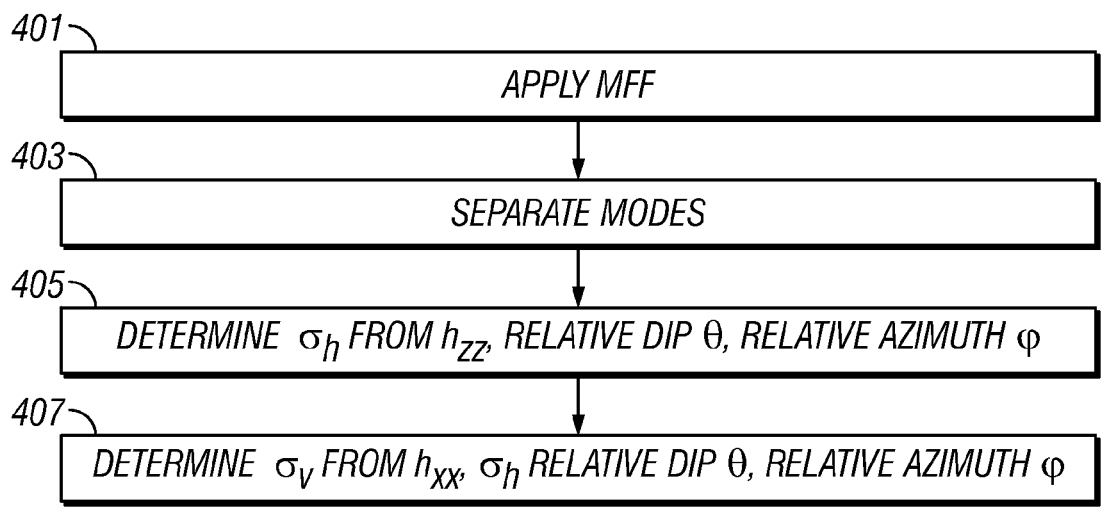
FIG. 4 is a flow chart illustrating one embodiment of the present invention.

FIG. 4 shows a flowchart of an exemplary embodiment of a first embodiment of the present invention. Multifrequency focusing is applied using the 3DEX™ measurement tool (Box 401). The obtained measurements are the components of the matrix of the left hand side of Eq. (11). If the angles θ and φ are known, separation of modes is then performed (Box 403). Fundamental modes are typically the principal components $h_{xx}$ and $h_{zz}$ of the diagonalized multifrequency matrix. One way to separate the modes is by performing a least squares operation, for example, on Eq. (13). Acquisition of at least 2 or more independent components enable a solution of Eq. (13), having 2 unknown on its right-hand side. Thus, a requirement is that the number $n_1$ of focused measurements must be at least, or must be capable of giving two independent measurements. In Box 405, knowledge of $h_{zz}$, relative dip θ, and relative azimuth φ enables determination of the horizontal conductivity, $\sigma_h$ using the standard prior art inversion methods, such as that described in Tabarovsky '045. Vertical conductivity $\sigma_v$ is then determined (Box 407) using $\sigma_h$, relative dip θ and relative azimuth φ, again using the standard prior art methods such as that in Tabarovsky '045. Calculations can be made either uphole or downhole. Downhole computation might comprise use of a processor or expert system.

Figure 5:
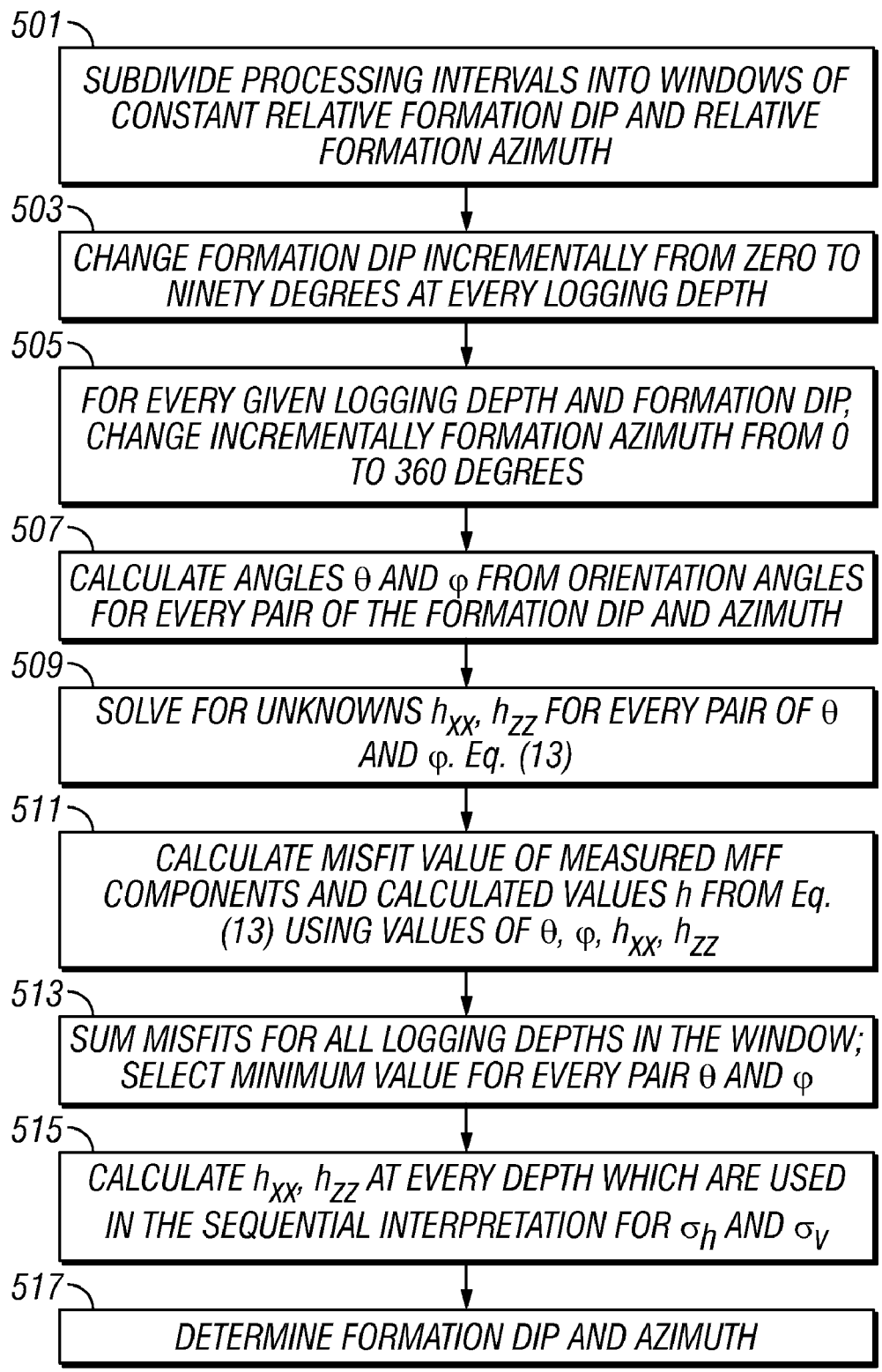
FIG. 5 is a flow chart illustrating a second embodiment of the present invention

FIG. 5 details an exemplary method of a second embodiment of the invention for recovering formation dip and formation azimuth given the obtained components of the present invention. Formation angles are determined simultaneously with the principal components. This is different from the method disclosed in Tabarovsky '045 where an iterative process is used for determination of formation angles. In Box 501, the entire processing interval is subdivided into relatively small windows in which values of the relative formation dip and relative formation azimuth within the windows are substantially constant. The term "relative" refers to the formation dip and azimuth in a wellbore based coordinate system. We denote these angles by θ and Φ. As shown in Box 503, a number of incremental values of relative formation dip are selected from a range, such as from zero to ninety degrees at every logging depth. At every given logging depth and formation dip, the relative formation azimuth is changed incrementally from 0 to 360 degrees. This change of relative formation azimuth is shown in Box 505. In Box 507, relative dip θ and relative azimuth φ in the tool coordinate system are calculated using the tool orientation angle. The relative dip θ in the tool coordinate system will be the same as the trial value of θ. The tool orientation angle necessary for this calculation is obtained using suitable orientation sensors. For example, magnetometers, may be used. In Box 509, the system of Eq. (13) for unknown $h_{xx}$ and $h_{zz}$ can be solved for every pair of relative dip θ and relative azimuth φ in the tool coordinate system (and corresponding values of θ and Φ in the borehole coordinate system). In Box 511, the four obtained values of θ, φ, $h_{xx}$, and $h_{zz}$ can be substituted in Eq. (13), and calculations can be made of a misfit value. Typically, a misfit value can be calculated using a norm of the measured MFF components and of the values of ĥ components according to eq. (13). In Box 513, for every pair of relative dip θ and relative azimuth φ (or alternately, for the formation dip and azimuth) the misfits can be summed at all logging depths in the window and a minimum value can be selected. The minimum value corresponds to a specific combination of θ and Φ. With the known θ and φ (or the formation dip and azimuth) $h_{xx}$ and $h_{zz}$ is calculated at every depth. The results of $h_{xx}$ and $h_{zz}$ are used in the sequential interpretation for $\sigma_h$ and $\sigma_v$, in Tabarovsky et al. '562. An advantage of the present invention over Tabarovsky '045 is the ability to obtain angles simultaneously without using a time-consuming iterative procedure. In addition, unlike the method of Tabarovsky '045, an initial estimate of formation dip and formation azimuth relative to borehole axis is not necessary. At 517, the absolute formation dip and azimuth in an earth coordinate system may be obtained using known values of borehole inclination and azimuth. Data regarding the borehole inclination and azimuth may be obtained from suitable survey sensors such as accelerometers and or gyroscopes.

The example given above was based on searching through a range of possible values of formation dip and azimuth in a borehole coordinate system. The method is equally applicable searching through a range of possible values of formation dip and azimuth in a fixed earth based coordinate system. The search could also be done in a tool-based coordinate system. Alternatively, any combination of coordinate systems may be used. The point to note is that angles are obtained simultaneously with resistivity parameters.

To illustrate the validity of the diagonalization procedure, a numerical example is presented. Single frequency and multi-frequency responses are calculated in a thick anisotropic layer with $\sigma_h$=1 S/m, $\sigma_v$=0.25 S/m. The angles of relative dip and relative rotation are, respectively, θ=60°, φ=30°. The principal components of the single frequency magnetic matrix (skin-effect corrected and normalized to apparent conductivity, in S/m) become $$\hat{H} = \begin{pmatrix} 0.496 & 0 & 0.99 \\ 0 & 0.678 & 0 \\ 0.99 & 0 & 1.03 \end{pmatrix}, \quad (14)$$

It is noted that in eq. (14), the terms $h_{xx}$ and $h_{yy}$ are not equal. In addition, $h_{xz}$ and $h_{zx}$ have significant non zero values.

In contrast, focused multi-frequency principal components normalized to apparent conductivity become $$\hat{H}_{MFF} = \begin{pmatrix} 0.572 & 0 & 0.019 \\ 0 & 0.580 & 0 \\ 0.019 & 0 & 0.973 \end{pmatrix}. \quad (15)$$

Numerical results, eq. (15), agree with the theoretical results within numerical accuracy of calculation of the MFF and skin-effect corrected components.

Another example illustrates the ability of the present invention to enable angle determination. To demonstrate use of the present invention for determining angles, as described above, the measurements of the 3DEX™ tool in a thick anisotropic layer are simulated with $\sigma_h$=1 S/m and $\sigma_v$=0.25 S/m for three different combinations of relative dip and relative rotation angles. The MFF transformation is applied to all five obtained magnetic field components and then the algorithm of FIG. 5 is executed. Table 1 presents the original relative dip and rotation angles and results of the processing.

TABLE 1

| # | Model parameters | | | | Recovered parameters | | | |
|---|---|---|---|---|---|---|---|---|
| | $\theta$ (deg) | $\phi$ (deg) | $\hbar_{xx}$(S/m) | $\hbar_{zz}$(S/m) | $\theta$ (deg) | $\phi$ (deg) | $\hbar_{xx}$(S/m) | $\hbar_{zz}$(S/m) |
| 1 | 40 | 30 | 0.576 | 0.973 | 39 | 30 | 0.570 | 0.971 |
| 2 | 54.73 | 45 | 0.576 | 0.973 | 53 | 44 | 0.576 | 0.965 |
| 3 | 70 | 80 | 0.576 | 0.973 | 70 | 80 | 0.578 | 0.960 |

The processing results agree very well with the original angles.

The present invention has been described with reference to a wireline conveyed apparatus. This is not to be construed as a limitation and the method of the present invention can also be carried out on a measurement-while-drilling logging tool conveyed on a drilling tubular such as a drillstring or coiled tubing.

While the foregoing disclosure is directed to the specific embodiments of the invention, various modifications will be apparent to those skilled in the art. It is intended that all such variations within the scope and spirit of the appended claims be embraced by the foregoing disclosure.

The invention claimed is:

1. A method of logging an earth formation comprising a plurality of layers each having a horizontal conductivity and a vertical conductivity, said method comprising:
   (a) conveying an electromagnetic logging tool through a borehole in said earth formation, said logging tool including at least one transmitter and at least one receiver, said borehole having an axis inclined at a relative dip angle $\theta$ to a normal to said layers;
   (b) getting measurements at a number $n_1$ of transmitter-receiver orientations at a number $n_2$ of frequencies, wherein $n_1$ and $n_2$ are greater than 1;
   (c) processing said measurements in (b) to give $n_1$ focused measurements;
   (d) processing said $n_1$ focused measurements using $\theta$ and $\Phi$ (a relative azimuth angle) to obtain at least two fundamental modes of a diagonal tensor of multi-frequency focused measurements;
   (e) determining from one of said at least two fundamental modes an estimate of said horizontal conductivity of said earth formation; and
   (f) storing said estimate of horizontal conductivity to a suitable medium;
   wherein said $n_1$ focused measurements are independent and wherein the processing in (d) further comprises solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\theta^2 \\ c_\phi s_\phi - c_\phi s_\phi c_\theta^2 & -c_\phi s_\phi s_\theta^2 \\ c_\phi c_\theta s_\theta & -c_\phi c_\theta s_\theta \\ c_\phi s_\phi - c_\phi s_\phi c_\theta^2 & -c_\phi s_\phi s_\theta^2 \\ s_\phi^2 c_\theta^2 + c_\phi^2 & s_\phi^2 s_\theta^2 \\ -s_\phi c_\theta s_\theta & s_\phi c_\theta s_\theta \\ c_\phi c_\theta s_\theta & -c_\phi c_\theta s_\theta \\ -s_\phi c_\theta s_\theta & s_\phi c_\theta s_\theta \\ s_\theta^2 & c_\theta^2 \end{pmatrix} \begin{pmatrix} \hbar_{xx} \\ \hbar_{zz} \end{pmatrix}$$

where
$\theta$ is a relative inclination of the borehole axis to the normal to the bedding, $\phi$ is an azimuth in a tool coordinate system,
$s_\phi = \sin \phi$,
$c_\phi = \cos \phi$,
$s_\theta = \sin \theta$,
$c_\theta = \cos \theta$, and
$\hbar_{xx}$ and $\hbar_{zz}$ are said at least two fundamental modes.

2. The method of claim 1 wherein said measurements at said $n_1$ transmitter-receiver orientations comprise measurements made by transmitters and receivers in an orthogonal configuration.

3. The method of claim 2 wherein said transmitters and receivers in said orthogonal configuration are fixed on the electromagnetic logging tool.

4. The method of claim 1 wherein said measurements at said $n_1$ transmitter-receiver orientations comprise measurements made by transmitters and receivers in a non-orthogonal configuration.

5. The method of claim 1 wherein said solving is done in a least squares sense.

6. The method of claim 1 further comprising determining from another of said at least two fundamental modes and said estimate of said horizontal conductivity an estimate of said vertical conductivity of said earth formation.

7. A method of logging an earth formation comprising a plurality of layers each having a horizontal conductivity and a vertical conductivity, said method comprising:
   a) conveying an electromagnetic logging tool into a borehole in said earth formation, and getting measurements at a number $n_1$ of transmitter-receiver orientations at a number $n_2$ of frequencies, wherein $n_1$ and $n_2$ are greater than 1;
   (b) processing said measurements to give $n_1$ focused measurements;
   (c) processing said $n_1$ focused measurements to simultaneously obtain at least two fundamental modes of a diagonal tensor of multi-frequency focused measurements, an estimate of a relative dip angle $\theta$ and an estimate of a relative azimuth angle $\phi$; and
   (d) storing at least one of the estimates to a suitable medium;
   wherein said $n_1$ focused measurements provide at least four independent measurements and wherein the processing in (c) further comprises solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\theta^2 \\ c_\phi s_\phi - c_\phi s_\phi c_\theta^2 & -c_\phi s_\phi s_\theta^2 \\ c_\phi c_\theta s_\theta & -c_\phi c_\theta s_\theta \\ c_\phi s_\phi - c_\phi s_\phi c_\theta^2 & -c_\phi s_\phi s_\theta^2 \\ s_\phi^2 c_\theta^2 + c_\phi^2 & s_\phi^2 s_\theta^2 \\ -s_\phi c_\theta s_\theta & s_\phi c_\theta s_\theta \\ c_\phi c_\theta s_\theta & -c_\phi c_\theta s_\theta \\ -s_\phi c_\theta s_\theta & s_\phi c_\theta s_\theta \\ s_\theta^2 & c_\theta^2 \end{pmatrix} \begin{pmatrix} \hbar_{xx} \\ \hbar_{zz} \end{pmatrix}$$

where
$\theta$ is a relative inclination of the borehole axis to the normal to the bedding, $\phi$ is an azimuth in a tool coordinate system, $s_\phi = \sin \phi$,
$c_\phi = \cos \phi$,
$s_\theta = \sin \theta$,
$c_\theta = \cos \theta$, and
$\tilde{h}_{xx}$ and $\tilde{h}_{zz}$ are said at least two fundamental modes.

8. The method of claim 7 wherein said measurements at said $n_1$ transmitter-receiver orientations comprise measurements made by transmitters and receivers in an orthogonal orientation.

9. The method of claim 8 wherein said transmitters and receivers in said orthogonal configuration are fixed on the electromagnetic logging tool.

10. The method of claim 7 wherein said measurements at said $n_1$ transmitter-receiver orientations comprise measurements made by transmitters and receivers in a non-orthogonal orientation.

11. The method of claim 7 further comprising determining a misfit to said equation at at least one of said plurality of depths.

12. The method of claim 11 further comprising determining a misfit to said equation at all of said plurality of depths.

13. The method of claim 7 further comprising:
   (i) defining a plurality of formation dip angles relative to the borehole;
   (ii) defining a plurality of formation azimuth angles relative to the borehole;
   (iii) determining for said plurality of relative formation dip angles and said relative formation azimuth angles, corresponding values of dip $\theta$ and azimuth $\phi$ using toolface angle measurements;
   (iv) determining a misfit to said equation for each of said corresponding possible values of $\theta$ and $\phi$;
   (v) summing said misfits over said depth interval; and
   (vi) finding particular values of said plurality of relative formation dip angles and said plurality of relative formation azimuth angles for which said sum attains a minimum.

14. The method of claim 7 further comprising determining from one of said at least two fundamental modes an estimate of said horizontal conductivity of said earth formation.

15. The method of claim 14 further comprising determining from another of said at least two fundamental modes and said estimate of said horizontal conductivity an estimate of said vertical conductivity of said earth formation.

16. The method of claim 7 further comprising:
   determining from a borehole inclination and a borehole azimuth in said earth coordinate system, and said estimates of $\theta$ and $\phi$ an estimate of an absolute formation dip $\Theta$ and absolute formation azimuth $\Phi$ in said earth coordinate system.

17. The method of claim 16 further comprising using a survey instrument for obtaining said values of said borehole inclination and said borehole azimuth in said earth coordinate system.

18. An apparatus for logging an earth formation having a plurality of layers each having a horizontal conductivity and a vertical conductivity, said apparatus comprising:
   a) an electromagnetic logging tool having at least one transmitter and at least one receiver, said logging tool configured to be conveyed in a borehole having an axis inclined at a angle dip angle $\theta$ to a normal to said layers, said logging tool configured to make measurements with a number $n_1$ of transmitter-receiver orientations at a number $n_2$ of frequencies, wherein $n_1$ and $n_2$ are greater than 1; and (c) a processor which is configured to:
   (A) determine $n_1$ focused measurements from said measurements in (a); and
   (B) process said $n_1$ focused measurements using a relative dip angle $\theta$ and a relative azimuth angle $\phi$ into at least two fundamental modes of a diagonal tensor of multi-frequency focused measurements;
   wherein said $n_1$ focused measurements are independent and wherein the processing in (c)(B) further comprises solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\phi^2 \\ c_\phi s_\phi - c_\phi s_\phi c_\theta^2 & -c_\phi s_\phi s_\theta^2 \\ c_\phi c_\theta s_\theta & -c_\phi c_\theta s_\theta \\ c_\phi s_\phi - c_\phi s_\phi c_\theta^2 & -c_\phi s_\phi s_\theta^2 \\ s_\kappa^2 c_\theta^2 + c_\phi^2 & s_\phi^2 s_\phi^2 \\ -s_\phi c_\theta s_\theta & s_\phi c_\theta s_\theta \\ c_\phi c_\theta s_\theta & -c_\phi c_\theta s_\theta \\ -s_\phi c_\theta s_\theta & s_\phi c_\theta s_\theta \\ s_\theta^2 & c_\theta^2 \end{pmatrix} \begin{pmatrix} \hbar_{xx} \\ \hbar_{zz} \end{pmatrix}$$

where
$\theta$ is a relative inclination of the borehole axis to the normal to the bedding, $\phi$ is an azimuth in a tool coordinate system,
$s_\phi = \sin \phi$,
$c_\phi = \cos \phi$,
$s_\theta = \sin \theta$,
$c_\theta = \cos \theta$, and
$\tilde{h}_{xx}$ and $\tilde{h}_{zz}$ are said at least two fundamental modes.

19. The apparatus of claim 18 wherein said measurements at said $n_1$ transmitter-receiver orientations comprise measurements made with orthogonal transmitters and receivers.

20. The apparatus of claim 19 wherein said at least one transmitter and said at least one receiver are fixed on the electromagnetic logging tool.

21. The apparatus of claim 18 wherein said measurements at said $n_1$ transmitter-receiver orientations comprise measurements made with non-orthogonal transmitters and receivers.

22. The apparatus of claim 18 wherein said processor is configured to determine from one of said at least two fundamental modes an estimate of said horizontal conductivity of said formation.

23. The apparatus of claim 22 wherein said processor is further configured to determine from another of said at least two fundamental modes and said estimate of said horizontal conductivity an estimate of said vertical conductivity of said earth formation.

24. The apparatus of claim 18 wherein said processor is at a downhole location.

25. The apparatus of claim 18 wherein said processor is at a surface location.

26. The apparatus of claim 18 further comprising a conveyance device for said logging tool, said conveyance device selected from (i) a wireline, (ii) a drillstring, and, (iii) coiled tubing.

27. An apparatus for logging an earth formation having a plurality of layers each having a horizontal conductivity and a vertical conductivity, said apparatus comprising:
   a) an electromagnetic logging tool including at least one transmitter and at least one receiver inclined to an axis of the tool by a non zero angle, said logging tool configured to be conveyed in a borehole in said earth formation and configured to make measurements at a number $n_1$ of transmitter-receiver orientations at a number $n_2$ of frequencies wherein $n_1$ and $n_2$ are greater than 1;

(b) a processor which is configured to:
(A) process said measurements in (a) to give $n_1$ focused measurements; and
(B) process non-iteratively said $n_1$ focused measurements to obtain two fundamental modes of a diagonal tensor of multi-frequency focused measurements, an estimate of a relative dip angle θ and an estimate of a relative azimuth angle φ;

wherein said $n_1$ focused measurements provide at least four independent measurements and wherein the processing in (d) further comprises solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\varphi^2 c_\theta^2 + s_\varphi^2 & c_\varphi^2 s_\varphi^2 \\ c_\varphi s_\varphi - c_\varphi s_\varphi c_\theta^2 & -c_\varphi s_\varphi s_\theta^2 \\ c_\varphi c_\theta s_\theta & -c_\varphi c_\theta s_\theta \\ c_\varphi s_\varphi - c_\varphi s_\varphi c_\theta^2 & -c_\varphi s_\varphi s_\theta^2 \\ s_\varphi^2 c_\theta^2 + c_\varphi^2 & s_\varphi^2 s_\varphi^2 \\ -s_\varphi c_\theta s_\theta & s_\varphi c_\theta s_\theta \\ c_\varphi c_\theta s_\theta & -c_\varphi c_\theta s_\theta \\ -s_\varphi c_\theta s_\theta & s_\varphi c_\theta s_\theta \\ s_\theta^2 & c_\theta^2 \end{pmatrix} \begin{pmatrix} \hbar_{xx} \\ \hbar_{zz} \end{pmatrix}$$

where
θ is a relative inclination of the borehole axis to the normal to the bedding, φ is an azimuth in a tool coordinate system,
$s_\phi = \sin \phi$,
$c_\phi = \cos \phi$,
$s_\theta = \sin \theta$,
$c_\theta = \cos \theta$, and
$\hbar_{xx}$ and $\hbar_{zz}$ are said at least two fundamental modes.

28. The apparatus of claim 27 wherein said measurements at said $n_1$ transmitter-receiver orientations comprise measurements made with orthogonal transmitters and receivers.

29. The apparatus of claim 28 wherein said at least one transmitter and said at least one receiver are fixed on the electromagnetic logging tool.

30. The apparatus of claim 27 wherein measurements at said $n_1$ transmitter-receiver orientations comprise measurements with non-orthogonal transmitters and receivers.

31. The apparatus of claim 27 wherein said processor is further configured to determine a misfit to said equation at at least one of said plurality of depths.

32. The apparatus of claim 31 wherein said processor is further configured to determine a misfit to said equation at all of said plurality of depths.

33. The apparatus of claim 27 wherein said processor is further configured to:
(i) define a plurality of formation dip angles relative to the borehole;
(ii) define a plurality of formation azimuth angles relative to the borehole;
(iii) determine for said plurality of formation dip angles and formation azimuth angles corresponding values of θ and φ using toolface angle measurements;
(iv) determine a misfit to said equation for each of said corresponding possible values of Θ and Φ;
(v) sum said misfits over said depth interval; and
(vi) find particular values of said possible values of Θ and Φ for which said sum attains a minimum.

34. The apparatus of claim 27 wherein said processor is further configured to determine from one of said at least two fundamental modes an estimate of said horizontal conductivity of said earth formation.

35. The apparatus of claim 34 wherein said processor is further configured to determine from another of said at least two fundamental modes and said estimate of said horizontal conductivity an estimate of said vertical conductivity of said earth formation.

36. The apparatus of claim 27 wherein said processor is further configured to:
use a borehole inclination and a borehole azimuth in an earth coordinate system, and determines from said estimate of θ and said estimate of φ an estimate of an absolute formation dip and formation azimuth.

37. The apparatus of claim 36 further comprising a survey instrument configured to provide values of said borehole inclination and said borehole azimuth.

38. The apparatus of claim 27 wherein said processor is at a surface location.

39. The apparatus of claim 27 wherein said processor is at a downhole location.

40. The apparatus of claim 27 further comprising a conveyance device configured to convey said electromagnetic logging tool into said borehole, said conveyance device selected from the group consisting of (i) a wireline, (ii) a drillstring, and, (iii) coiled tubing.

* * * * *